US008505986B2

(12) United States Patent
Sun

(10) Patent No.: US 8,505,986 B2
(45) Date of Patent: Aug. 13, 2013

(54) HOOK MODULE OF ELECTRONIC DEVICE

(75) Inventor: Shih-Chieh Sun, Taipei (TW)

(73) Assignee: Asustek Computer Inc., Taipei (TW)

( * ) Notice: Subject to any disclaimer, the term of this patent is extended or adjusted under 35 U.S.C. 154(b) by 225 days.

(21) Appl. No.: 12/862,854

(22) Filed: Aug. 25, 2010

(65) Prior Publication Data

US 2011/0047765 A1    Mar. 3, 2011

(30) Foreign Application Priority Data

Sep. 1, 2009    (TW) ................................ 98129455 A

(51) Int. Cl.
*E05C 19/06*    (2006.01)
*E05C 19/00*    (2006.01)

(52) U.S. Cl.
USPC ...... 292/80; 292/137; 292/163; 292/DIG. 38; 292/DIG. 63

(58) Field of Classification Search
USPC .................... 292/80, 137, 138, 163, DIG. 20, 292/DIG. 38, DIG. 47, DIG. 51, DIG. 53, 292/DIG. 55, DIG. 63
See application file for complete search history.

(56) References Cited

U.S. PATENT DOCUMENTS

| 123,657 | A | * | 2/1872 | Young | 292/175 |
| 550,424 | A | * | 11/1895 | Smith | 70/150 |
| 697,599 | A | * | 4/1902 | Barrett | 70/150 |
| 2,812,204 | A | * | 11/1957 | Squire | 292/334 |
| 3,125,366 | A | * | 3/1964 | Cetrone et al. | 292/169.14 |
| 3,632,007 | A | * | 1/1972 | Kantor | 217/57 |
| 3,724,889 | A | * | 4/1973 | Dooley | 292/87 |
| 4,390,198 | A | * | 6/1983 | Selinko | 292/152 |
| 4,662,664 | A | * | 5/1987 | Wendt et al. | 292/19 |
| 4,791,756 | A | * | 12/1988 | Simpson | 49/175 |
| 4,818,000 | A | * | 4/1989 | Bobrowski | 292/147 |
| 5,028,083 | A | * | 7/1991 | Mischenko | 292/175 |
| 7,874,598 | B2 | * | 1/2011 | Chung | 292/163 |

FOREIGN PATENT DOCUMENTS

TW    M282227 U    12/2005

OTHER PUBLICATIONS

English translation of abstract of TW M282227.
Taiwan Office Action issued Sep. 17, 2012.

* cited by examiner

*Primary Examiner* — Carlos Lugo
(74) *Attorney, Agent, or Firm* — McClure, Qualey & Rodack, LLP

(57) ABSTRACT

A hook module of an electronic device is disclosed. The hook module includes a base and a hook body. The base includes two positioning pillars and a side board, and the hook body is located on the base with one end passing through the side board. The hook body includes two elastic arms located at two edges of the hook body, respectively, and each of the elastic arms includes an abutting portion. When the hook body is moved by force applied on it, the two abutting portions abut against the two positioning pillars. The two positioning pillars and the two abutting portions move relative to each other to make the two elastic arms deformed, and an elastic restoring force generated from the two elastic arms drives the hook body to restore.

9 Claims, 8 Drawing Sheets

HOOK MODULE OF ELECTRONIC DEVICE

CROSS-REFERENCES TO RELATED APPLICATIONS

This non-provisional application claims priority under 35 U.S.C. §119(a) on Patent Application No. 98129455 filed in Taiwan, R.O.C. on Sep. 1, 2009, the entire contents of which are hereby incorporated by reference.

BACKGROUND OF THE INVENTION

1. Field of the Invention

The invention relates to a hook module and, more particularly, to a hook module of an electronic device.

2. Description of the Related Art

With the fast development of science and technology, electronic techniques changes with each passing day. Consequently, electronic devices become important media for people to get information and communicate with others in daily life.

Electronic devices need batteries to provide power. To operate the electronic device conveniently, the battery is assembled in the electronic device. The assembling opening is usually protected by a cover to protect the components in the electronic device, thereby preventing the damage due to collision.

The cover is fixed to the electronic device via a hook. In the conventional technology, a guiding pillar extends from the end of the hook module, and a spring is sleeved on the guiding column. The base of the plate includes a baffle wall to make the spring provide a reacting force to make the hook structure move back. However, conventionally, the spring needs to be additionally assembled, which increases the assembling steps. Moreover, the hook structure with an extending portion in the end occupies larger space, and the operation stroke is larger. In addition, when the electronic device is operated, the spring may fall off due to a strong shake, and the hook module cannot restores.

BRIEF SUMMARY OF THE INVENTION

The invention discloses a hook module of an electronic device including a base and a hook body. The base includes two positioning pillars and a side board. The hook body is located on the base, and an end of the hook body passes through the side board. The hook body includes two elastic arms located at two edges of the hook body, and each of the two elastic arms includes an abutting portion. When the hook body moves by force applied on it, the two abutting portions abut against the two positioning pillars. The two positioning pillars and the two abutting portions move relative to each other to make the two elastic arms deformed, and an elastic restoring force of the two elastic arms drives the hook body to restore.

In addition, in an embodiment, the invention further includes a push button passing through the base and combined with the hook body. The hook body includes a fastening hole, and the push button includes a fastening portion to be embedded into the fastening hole, thereby fastening the hook body to the base.

With the elastic arms connected to the hook body, the hook body moves back to the original position by the restore force of the elastic arm. In an embodiment of the invention, a rail at an end of each elastic arm is embedded with the positioning pillar. The positioning pillars and the rails move relative to each other to make the elastic arms deformed when the hook body is pushed, thereby making the hook body move back by the restore force and restore to the original state. In the conventional technology, the hook module needs a spring to be additionally assembled, and thus the amount of the assembling steps is increased, and the spring is easily fall off. In the invention, the hook module may be assembled in a limited space, and comparing with the conventional technology, the moving space of the hook module in the invention is also reduced.

These and other features, aspects and advantages of the present invention will become better understood with regard to the following description, appended claims, and accompanying drawings.

DETAILED DESCRIPTION OF THE EMBODIMENTS

Figure 1:
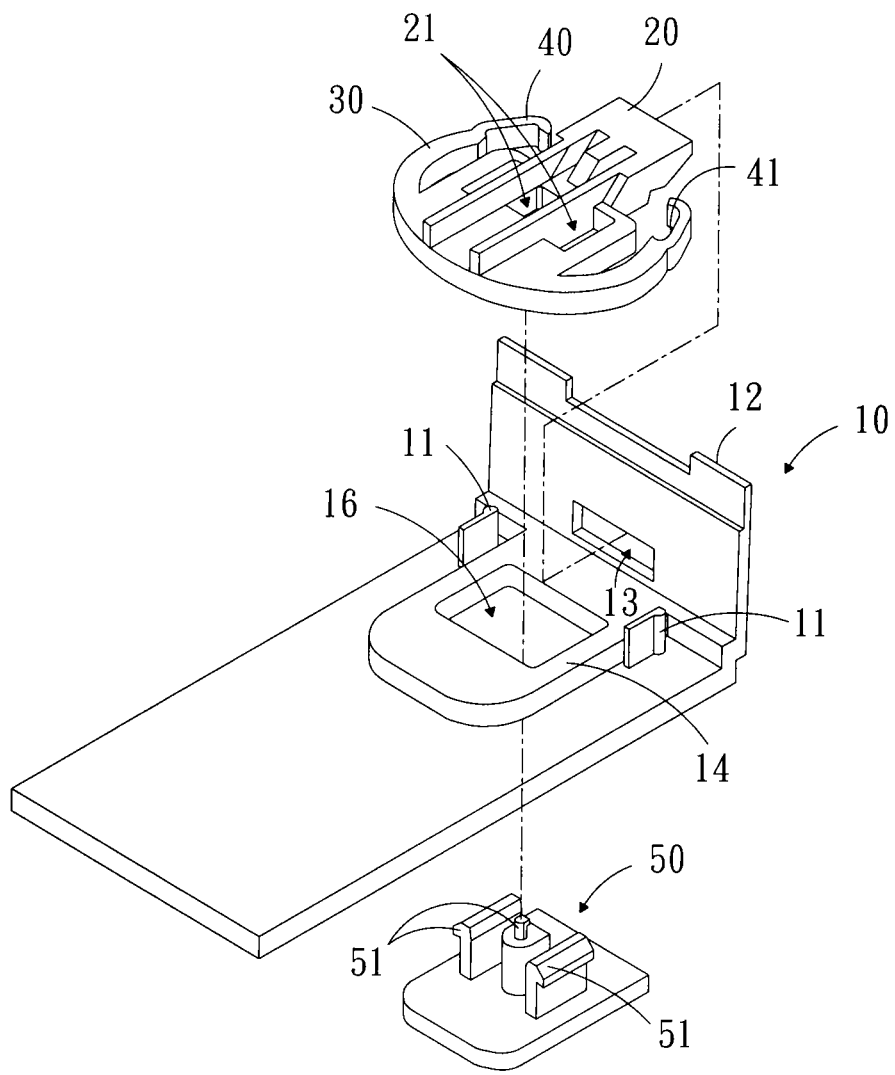
FIG. 1 is an exploded diagram showing a hook module in a first embodiment of the invention.
Figure 2:
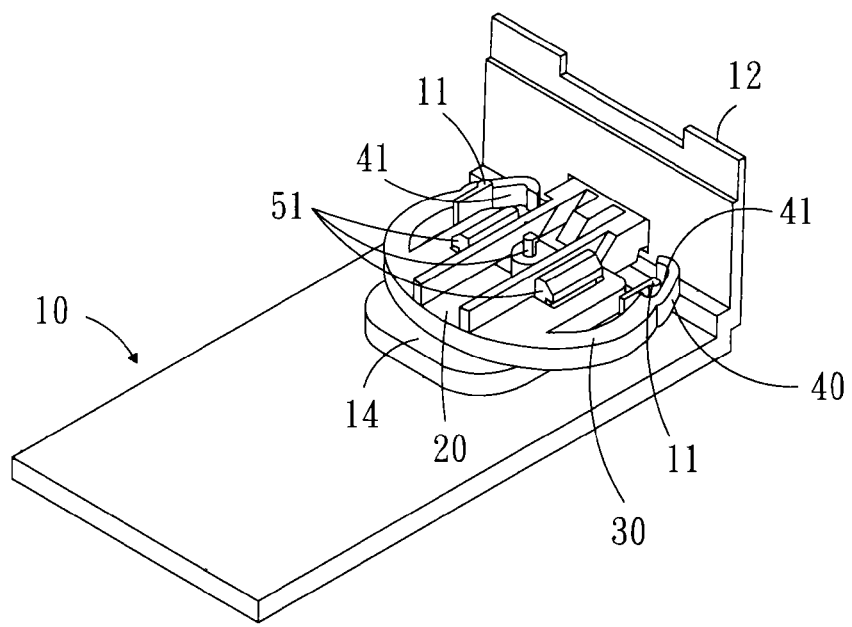
FIG. 2 is a schematic diagram showing the appearance of the hook module in the first embodiment of the invention.
Figure 3:
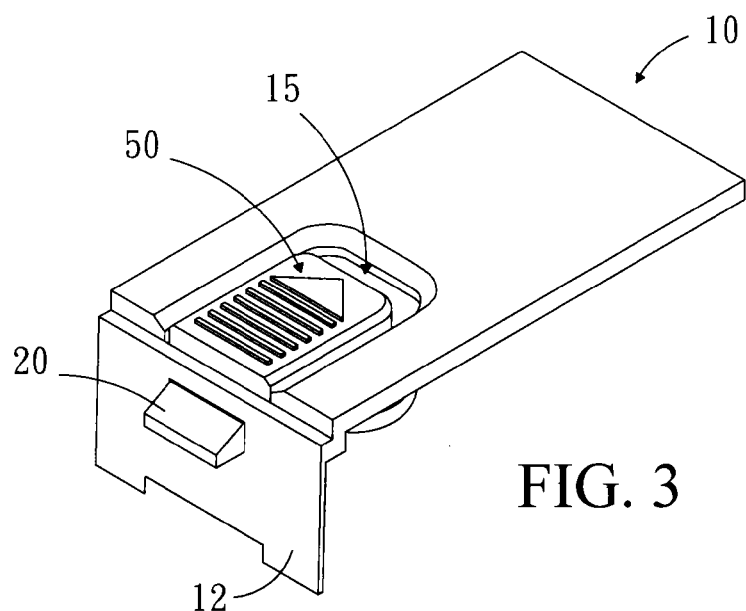
FIG. 3 is a three-dimensional diagram showing the hook module in another viewing aspect.

As shown in FIG. 1, FIG. 2 and FIG. 3, they are schematic diagrams showing a hook module of an electronic device in the first embodiment of the invention. The hook module of the electronic device includes a base 10 and a hook body 20.

The base 10 is approximately L-shaped with two positioning pillars 11 and a side board 12. The positioning pillar 11 may be column shaped to include a smooth contacting surface. The side board 12 is approximately a rectangle plate with an opening 13. The structures of the positioning pillars 11 and the side board 12 are just examples, and the invention is not limited thereto.

The hook body 20 is approximately rectangle, and it is located on the base 10. The opening 13 of the side board 12 allows the hook body 20 to be embedded in to make one end of the hook body 20 pass through and expose out of the side board 12 (as shown in FIG. 2). The hook body 20 is preferably made of polyoxymethylene (POM) plastic which may make the surface of the hook body 20 smoother.

The hook body 20 includes two elastic arms 30, and the two elastic arms 20 are approximately an arc-shaped strip structure. The two elastic arms 30 are located at two edges of the hook body 20, respectively, and the appearance of the hook body 20 is approximately C-shaped. In addition, the elastic arms 30 are preferably made of POM plastic, and the elastic arms 30 and the hook body 20 may be integrally formed.

Figure 4A:
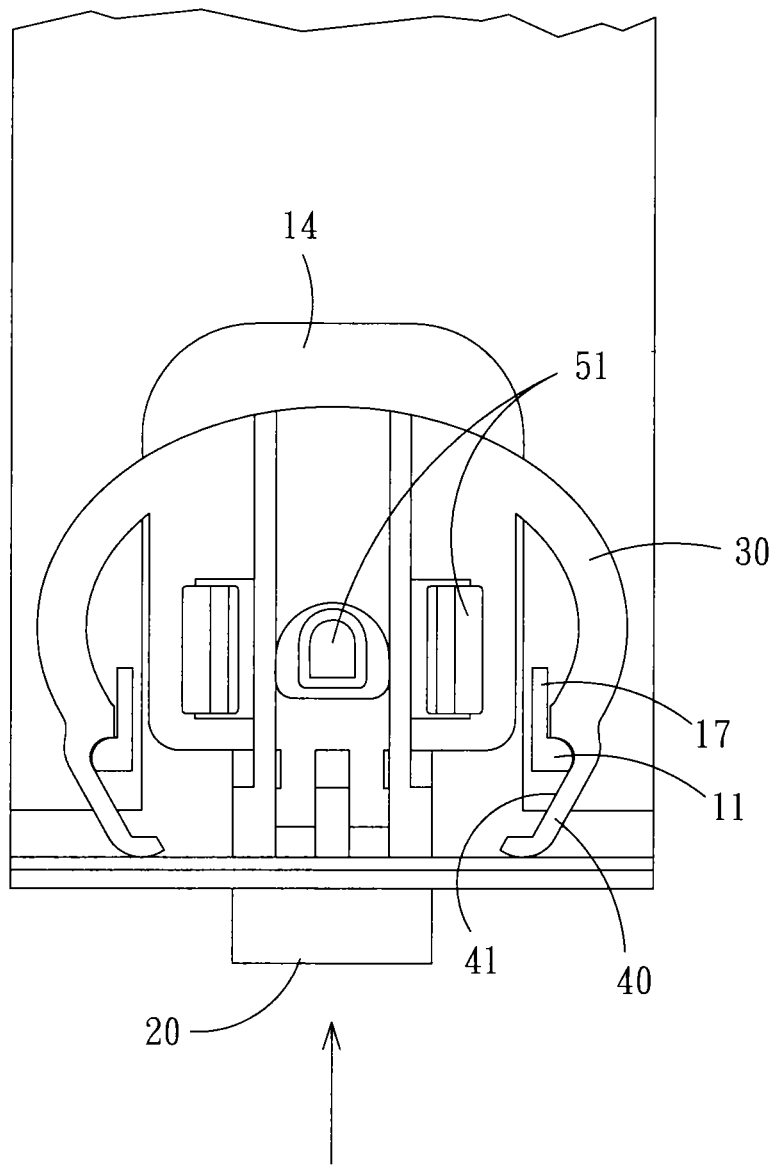
FIG. 4A and FIG. 4B are top view diagrams showing that the hook module is operated in the first embodiment of the invention.
Figure 4B:
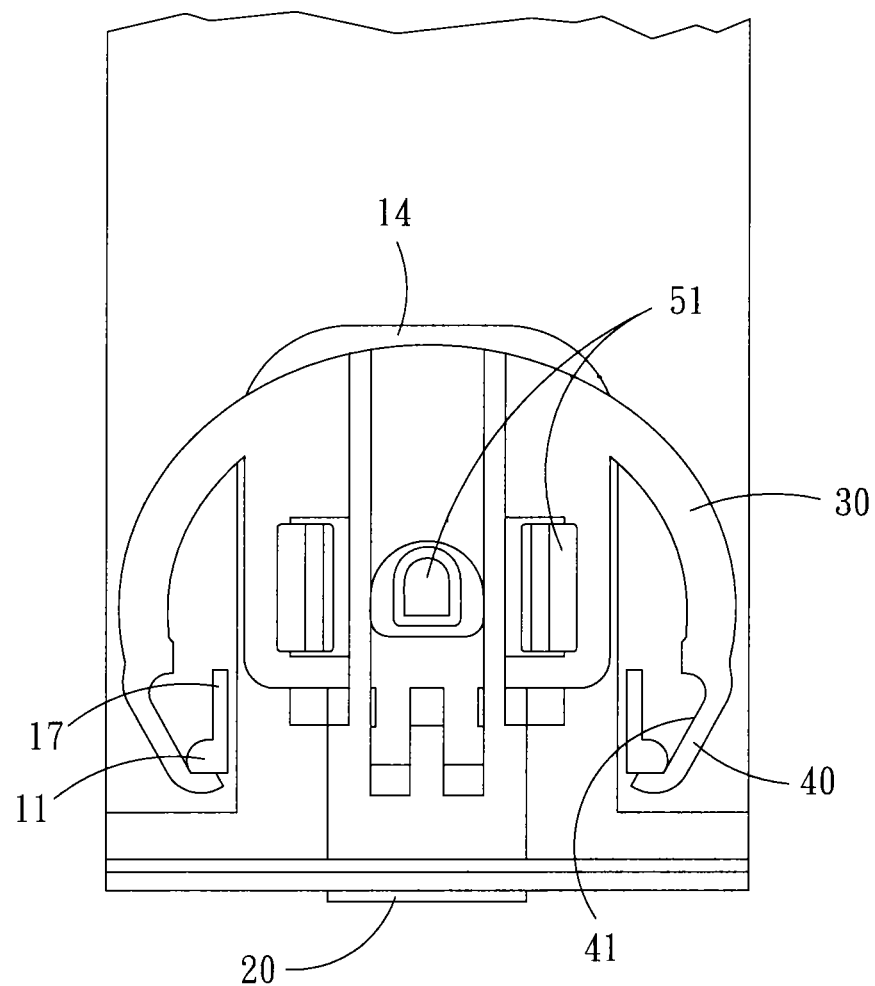

In addition, each of the two elastic arms 30 includes an abutting portion 40, and the two abutting portions 40 are approximately U-shaped, and they are against by the two positioning pillars 11. Each of the two abutting portions 40 includes an abutting surface 41 for contacting the two positioning pillars 11, respectively. When the hook body 20 is applied a force and moves, the two elastic arms 30 are deformed due to the relative displacement between the two positioning pillars 11 and two abutting portions 40, and the elastic restoring force of the two elastic arms 30 drives the hook body 20 to restore (as shown in FIG. 4A and FIG. 4B). In addition, the two abutting portions 40 and the two elastic arms 30 are preferably integrally formed. The two abutting portions 40 are preferably made of the POM plastic, and thus the abutting surface 41 may be smoother to make the two positioning pillars 11 and the two abutting portions 40 move relative to each other more easily. In the embodiment, the two positioning pillars 11 include block plates 17, respectively, to improve the strength and limit the displacement range of the two elastic arms 30.

The invention further includes a push button 50 with a fastening portion 51, and the hook body 20 includes a fastening hole 21. The fastening portion 51 is embedded in the fastening hole 21 to be combined with the hook body 20, and the hook body 20 is fastened to the base 10 (as shown in FIG. 3). In addition, the push button 50 is preferably a rectangle plate, but the invention is not limited thereto. The push button 50 further may include other shapes such as ellipse and round.

In addition, the base 10 further includes a sliding portion 14 for locating the hook body 20. A rectangle protrusion is formed at one surface of the sliding portion 14, and an accommodating space 15 is formed at the other surface. When the push button 50 is combined with the hook body 20, the accommodating space 15 accommodates the push button 50 and limits the moving direction of the push button 50.

The sliding portion 14 and the positioning pillar 11 are disposed near one side of the side board 12, and the positioning pillars 11 are located at two sides of the sliding portion 14, respectively, for abutting against the abutting portion. In addition, the sliding portion 14 further includes a through hole 16. When the push button 50 is combined with the hook body 20, the fastening portion 51 passes through the through hole 16 and embedded in the fastening hole 21 to be combined with the hook body 20 (as shown in FIG. 1).

In the hook module of the electronic device according to the invention, the fastening portion 51 is embedded in the fastening hole 21, and therefore, when the user pushes the push button 50, the hook body 20 is driven to move relative to the sliding portion 14. Then, the two abutting portions 40 are driven to move. In addition, the two positioning pillars abut against the abutting surfaces 41, respectively, and the two positioning pillars and the abutting surfaces 41 move relative to each other. As a result, the two elastic arms 30 extend outward due to the abutting force.

When the user releases the push button 50, there is no force applied on the push button 50. The elastic restoring force of the two elastic arms 30 makes the two elastic arms 30 move inward gradually. When the two elastic arms 30 move inward gradually, they drive the two abutting portions 40 to generate a compression force. In addition, since the two positioning pillars abut against the abutting surface 41, when the compression force is generated, a relative displacement between them is further generated. Then, the hook body 20 is driven to move along the sliding portion 14 and restore.

Figure 5:
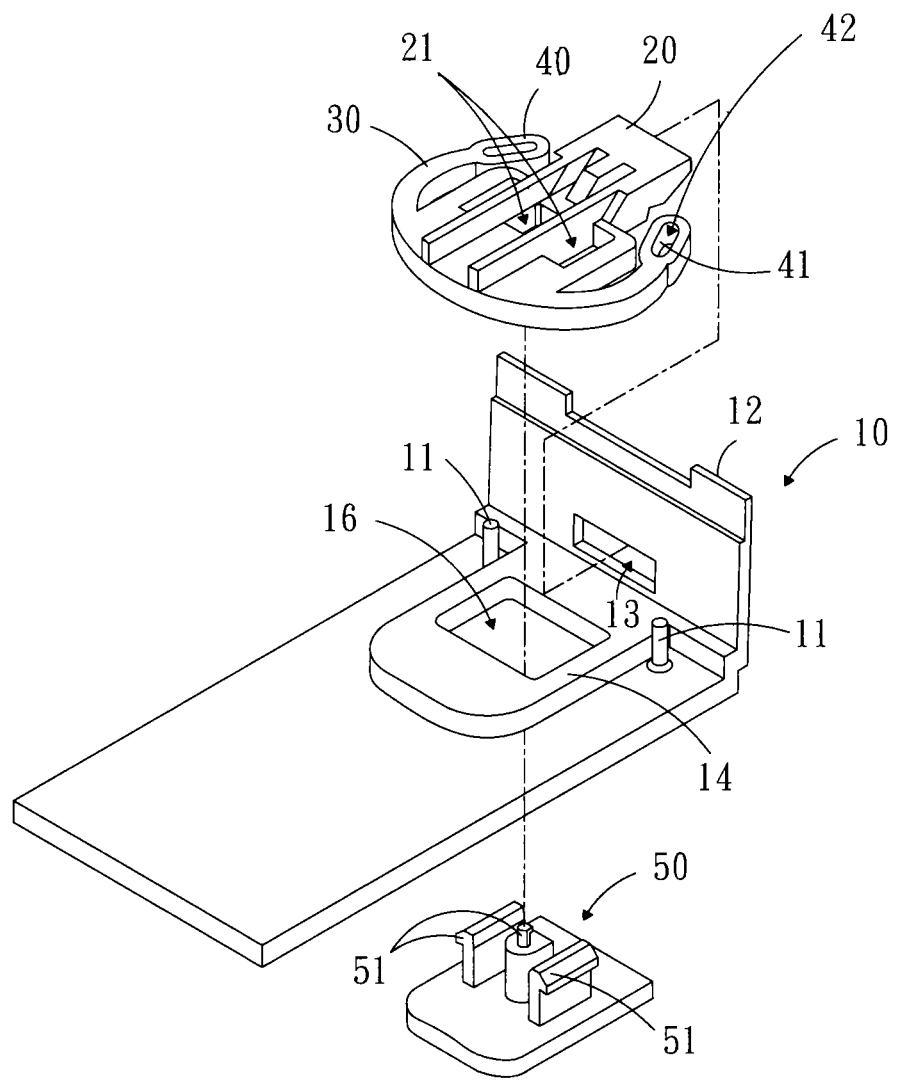
FIG. 5 is an exploded diagram showing the hook module in a second embodiment of the invention.
Figure 6:
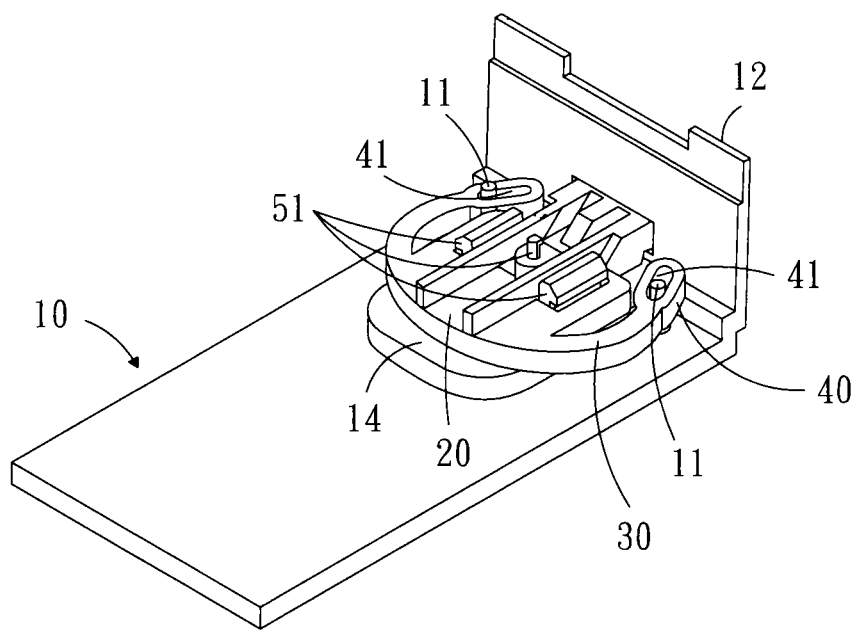
FIG. 6 is a schematic diagram showing the appearance of the hook module in the second embodiment of the invention.
Figure 7A:
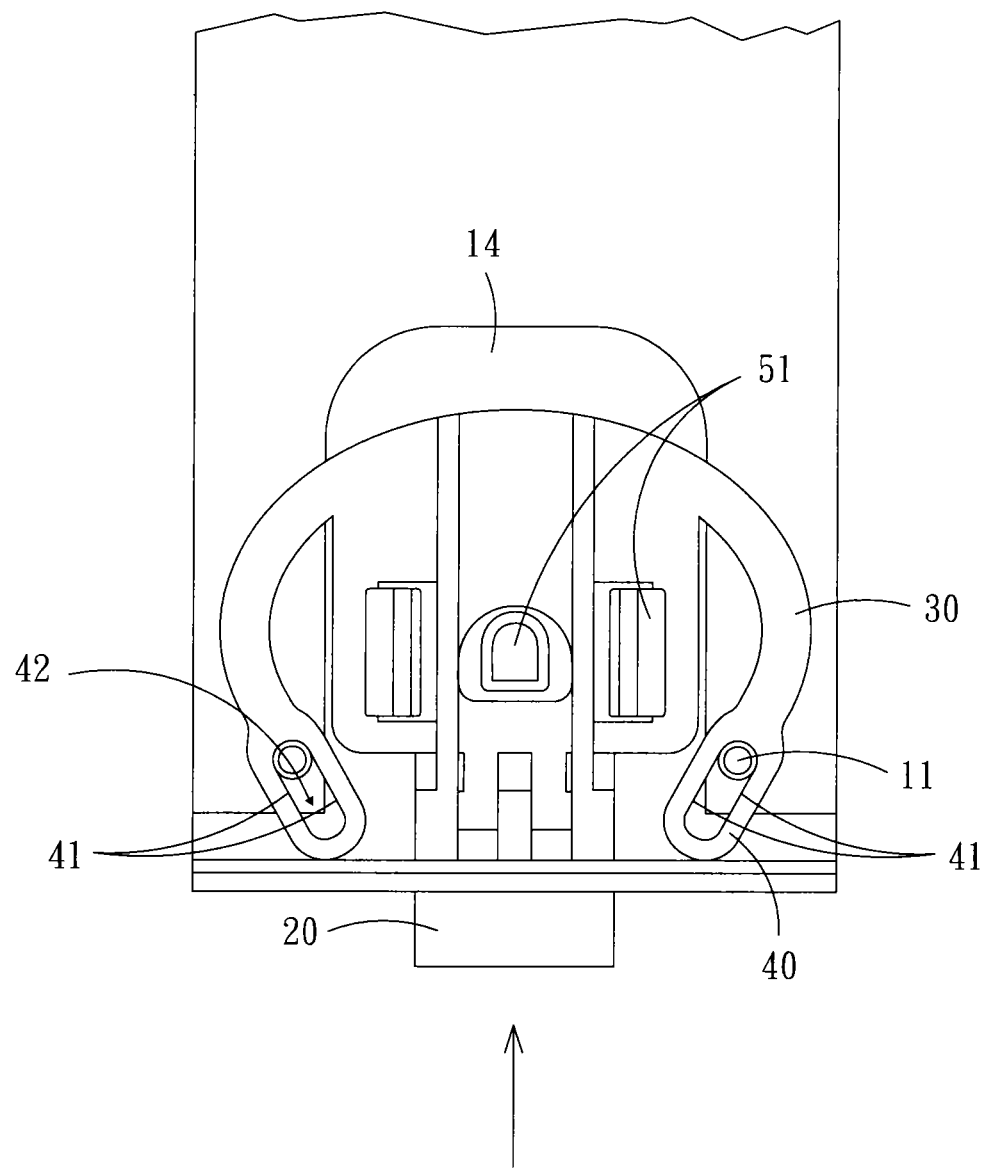
FIG. 7A and FIG. 7B are top view diagrams showing that the hook module is operated in the second embodiment of the invention.
Figure 7B:
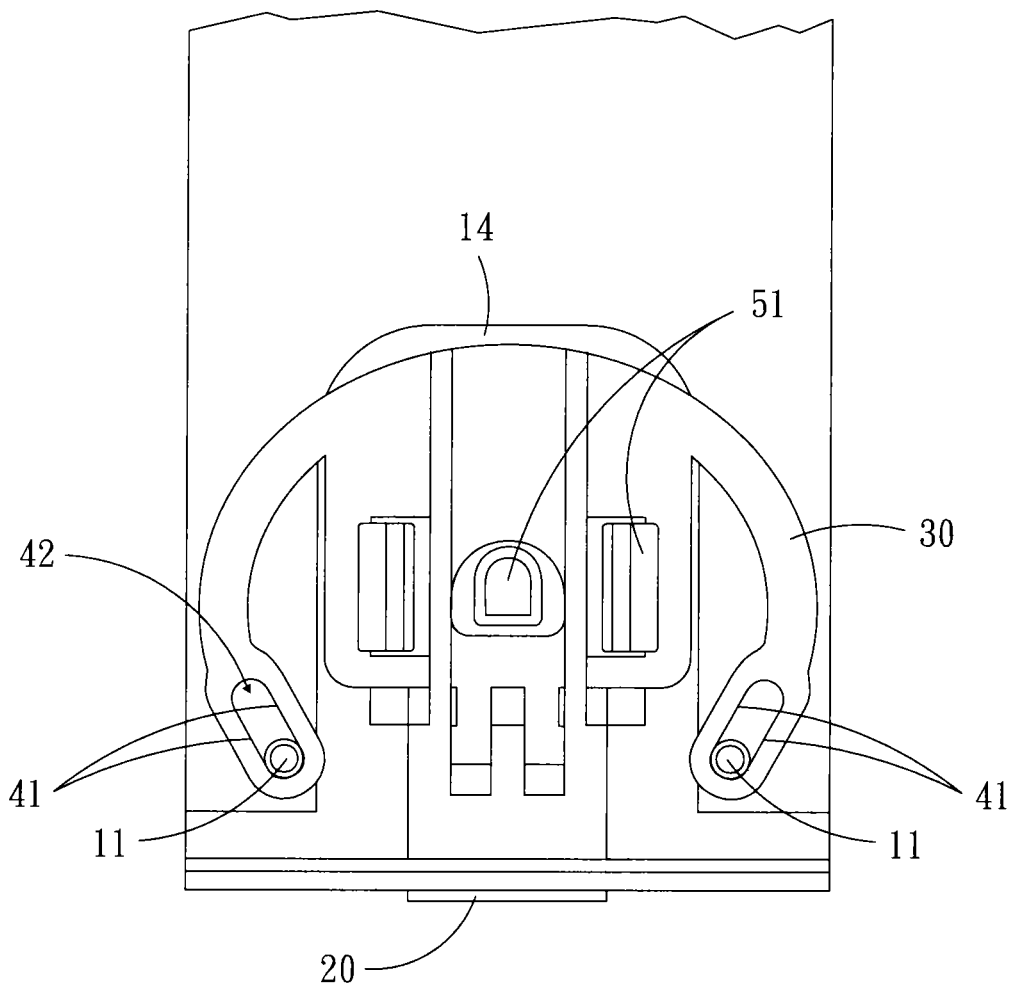

FIG. 5 and FIG. 6 are schematic diagrams showing the hook module of the electronic device in a second embodiment of the invention. The difference between the first embodiment and the second embodiment is the structures of the two abutting portions 40. In the second embodiment, the two abutting portions 40 herein include hollow rails 42, respectively, and the inner surface of the rail 42 forms an abutting surface 41. The two rails 42 are approximately a closed loop shaped, and two positioning pillars 11 are embedded in the two rails 42 to contact the abutting surfaces 41. As shown in FIG. 7A to FIG. 7B, when the hook body 20 moves by an applied force, the two positioning pillars 11 abut against the two abutting portions 40, respectively, and they moves in the two rails 42. Therefore, the two elastic arms 30 are deformed, and the elastic restoring force of the two elastic arms 30 drives the hook body 20 to restore.

In the invention, via elasticity of the elastic arms, the hook module does not need the spring. As a result, not only the cost of the material such as the spring is reduced, but also the assembling process is simplified, which saves the time in manufacturing and improves production efficiency. In addition, the hook module in the invention is approximately C-shaped, which occupies less space, and therefore, the electronic device includes larger available accommodating space.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A hook module of an electronic device, comprising:
   a base comprising:
      a sliding portion;
      two positioning pillars, located at two sides of the sliding portion respectively; and
      a side board, comprising an opening;
   an hook body, located on the sliding portion, wherein one end of the hook body passes through the opening of the side board, the hook body has two elastic arms with an abutting portion respectively, each of the two abutting portions comprises an abutting surface contacted with each of the two positioning pillars so that each abutting portion substantially surround each of the two positioning pillars; and
   a push button passing through the base to combine with the hook body;
   wherein, when the hook body is driven by movement of the push button, the two abutting portions abut against the two positioning pillars respectively, the two positioning pillars make the two elastic arms deformed; an elastic restoring force of the two elastic arms restore the two elastic arms to the original position, and the two elastic arms drives the hook body to move along the sliding portion.

2. The hook module of an electronic device according to claim 1, wherein each of the two abutting portions comprises a rail for contacting the two positioning pillars.

3. The hook module of an electronic device according to claim 2, wherein the abutting surfaces are formed in the rails.

4. The hook module of an electronic device according to claim 1, wherein the hook body comprises a fastening hole, and the push button comprises a fastening portion to be embedded in the fastening hole, thereby fastening the hook body to the base.

5. The hook module of an electronic device according to claim 1, wherein the sliding portion comprises a through hole, and a push button passes through the through hole and is combined with the hook body.

6. The hook module of an electronic device according to claim 5, wherein the sliding portion comprises an accommodating space for accommodating the push button.

7. The hook module of an electronic device according to claim 1, wherein each of the two positioning pillars comprises a block plate for limiting displacement of the two elastic arms.

8. The hook module of an electronic device according to claim 1, wherein the hook body and the two elastic arms are integrally formed.

9. The hook module of an electronic device according to claim 1, wherein the two elastic arms and the two abutting portions are integrally formed.

* * * * *